United States Patent [19]

Pate

[11] Patent Number: 5,796,034
[45] Date of Patent: Aug. 18, 1998

[54] WIRE PROTECTING SHIELD

[76] Inventor: Britt Pate, 525 Circle Lake Rd., Wichita, Kans. 67209

[21] Appl. No.: 832,366

[22] Filed: Apr. 2, 1997

[51] Int. Cl.⁶ ........................................... E04H 12/24
[52] U.S. Cl. ...................... 174/45 R; 174/100; 174/136; 138/127; 248/345.1
[58] Field of Search ........................ 174/48, 60, 100, 174/135, 136, 68.1, 68.2, 45 R; 411/548; 248/345.1; 138/127

[56] References Cited

U.S. PATENT DOCUMENTS

| | | | |
|---|---|---|---|
| 2,230,734 | 2/1941 | Van Antwerp | 174/45 R |
| 3,855,413 | 12/1974 | Baillie | 174/48 |
| 3,926,030 | 12/1975 | Baillie | 72/368 |
| 4,223,491 | 9/1980 | Vaughn | 52/147 |

*Primary Examiner*—Bot L. Ledynh
*Assistant Examiner*—Dhiru R. Patel
*Attorney, Agent, or Firm*—Kenneth H. Jack

[57] ABSTRACT

A wire protecting shield including an oblongated sheet metal plate having an upper surface, a lower surface, a right side, a left side, a right edge, a left edge, a first end, a second end, and having a midline axis; the right and left sides of the sheet metal plate being under-folded so that the right and left edges of the sheet metal plate are positioned substantially parallel with the midline axis, and respectively below and to the right and left of the midline axis, the sheet metal plate forming a wire protecting channel having a pair of sidewalls and a ceiling, the sidewalls including the right and left edges of the sheet metal plate, and the ceiling including the lower surface of the sheet metal plate.

7 Claims, 4 Drawing Sheets

WIRE PROTECTING SHIELD

FIELD OF THE INVENTION

The present invention relates to apparatus and articles for protecting wires exposed on exterior walls of buildings from tampering. In particular, the present invention relates to apparatus and articles for protecting from tampering telephone wires serving the telephone and alarm systems of commercial and residential buildings.

BACKGROUND OF THE INVENTION

In areas of the country where security from crime is a concern, a commercial or residential building's telephone system is typically an integral part of the building's security system. In the event an occupant of a building having a telephone system detects an intrusion by a criminal or an attempted break in, telephones in the building are commonly utilized to call the police. It is also common for a commercial or residential building to have an electronic burglar alarm system having electronic sensors for detecting criminal intrusions. Upon detection of an intrusion, such burglar alarm systems are commonly capable of automatically placing a warning telephone call to the police or to an alarm system monitoring company.

The efficiency of a building's telephone system as a crime preventing security measure tends to motivate an intruding criminal to attempt to deactivate a building's telephone system prior to breaking in. Where telephone wires serving a residential or commercial building are exposed on the exterior of the building, an intruder may simply cut the wire with side cutting pliers prior to entering the building. Typical methods of installation of telephone service in a commercial or residential building allow such cutting of telephone wires to occur.

One typical type of telephone wire installation extends telephone wires through underground conduits to a building's footing or foundation. Thence, the wire extends upwardly out of the ground, along the wall of the building to a telephone line junction box. Telephone wires extending from an underground conduit to a wall mounted telephone line junction box may be easily cut by an intruder. Another typical method of installing telephone service in a commercial or residential building extends a telephone line from a telephone pole overhead to the eve of the building, and thence extending downward along a wall to a telephone line junction box. Telephone wires so extending downward along the wall of a building are similarly easily cut by an intruder.

The ease with which an intruder may cut telephone lines extending along the wall of a typical commercial or residential building creates a need for a simply constructed and economical means of protecting and shielding such telephone wires from cutting or tampering by intruders.

SUMMARY OF THE INVENTION

The instant inventive wire protecting shield is preferably constructed from an elongated rectangular sheet of sheet steel, formed by a sheet metal forming press, and having attachment apertures drilled by a drill press.

The opposing sides of the rectangular sheet of sheet steel are each under-folded so that their right and left edges face each other, and are spaced apart, forming a channel of sufficient width to accommodate the width of the telephone wires to be shielded. In order to accommodate the height of telephone wires to be shielded, the ceiling of the channel, bounded on the left and the right by the under-folded left and right edges of the sheet metal plate, is arcuately upwardly bent, forming an upwardly concave extension of the channel.

After so bending the rectangular sheet of sheet steel, a plurality of screw receiving apertures are drilled along its right and left sides, each aperture passing through the upper portion of the shield and through the under-folded portion of the shield.

Where a telephone wire to be shielded overlies a flat wall surface suitable for receiving wood screws, the shield may simply be placed over the wire to be protected, with the wire extending along the covered channel. The shield may then be fixedly installed upon the wall by driving wood screws through the apertures and into the wall, the heads of the screws pressing the shield against the wall. Where the wall surface is not suitable for directly receiving wood screws, such as a wall having overlapping horizontal wooden slats, a wooden baseboard may be first installed vertically upon the wall, with the telephone wires extending vertically along the exterior surface of the baseboard. The wire protecting shield may then be installed over the wire on the exterior surface of the baseboard.

Preferably, screws used to install the wire protecting shield are "one way" headed screws which allow a clockwise motion of a common screwdriver to drive the screw, and which will not allow a counter-clockwise motion of such a screwdriver to withdraw the screw. Use of such "one way" screws prevents an intruder from silently and surreptitiously removing the wire protecting shield.

In operation, where a telephone wire is shielded by the instant inventive wire protecting shield, the wire may no longer be simply and conveniently cut by an intruder. Wires protected by the wire protecting shield remain subject to cutting or tampering only through use of implements such as a hacksaw or a crowbar. Such tampering methods are relatively time consuming, and noisy, giving an occupant of the building an opportunity to call the police or activate an alarm system prior to the cutting of the telephone wire by an intruder.

Accordingly, it is an object of the present invention to provide a wire protecting shield which is simply and economically constructed and which hinders an intruder's efforts to quickly and quietly deactivate a building's telephone system through cutting of external telephone wires.

It is a further object of the present invention to provide a wire protecting shield for application to the exterior wall surfaces of commercial and residential buildings, the wire protecting shield including one way screw attaching means for prevention of surreptitious removal of the shield.

Other and further objects and advantages of the present invention will become apparent to persons skilled in the art upon review of the detailed description which follows, and upon review of the drawings appended hereto.

DETAILED DESCRIPTION OF THE PREFERRED EMBODIMENT

Figure 1:
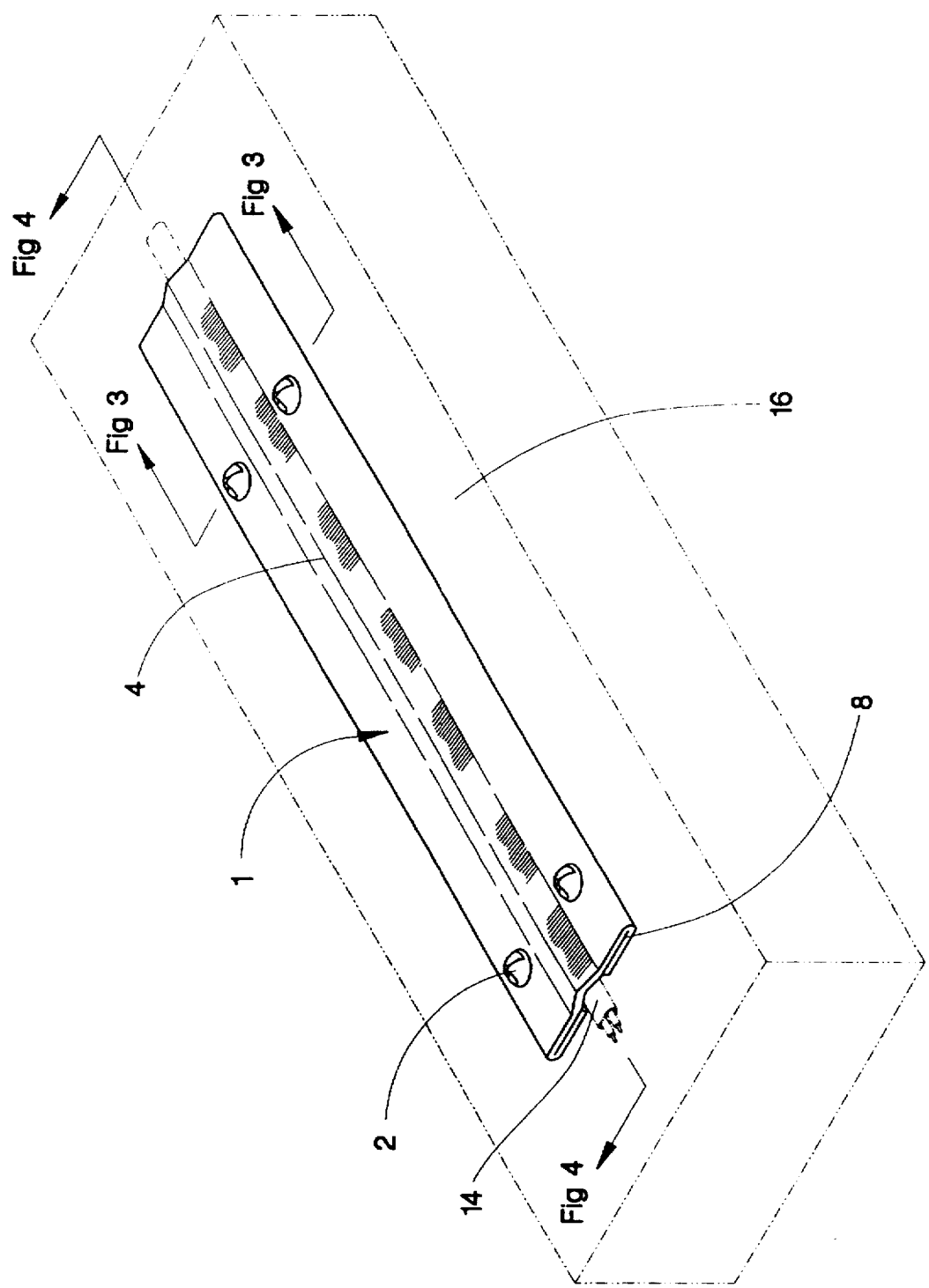
FIG. 1 is an isometric view of the wire protecting shield.
Figure 3:
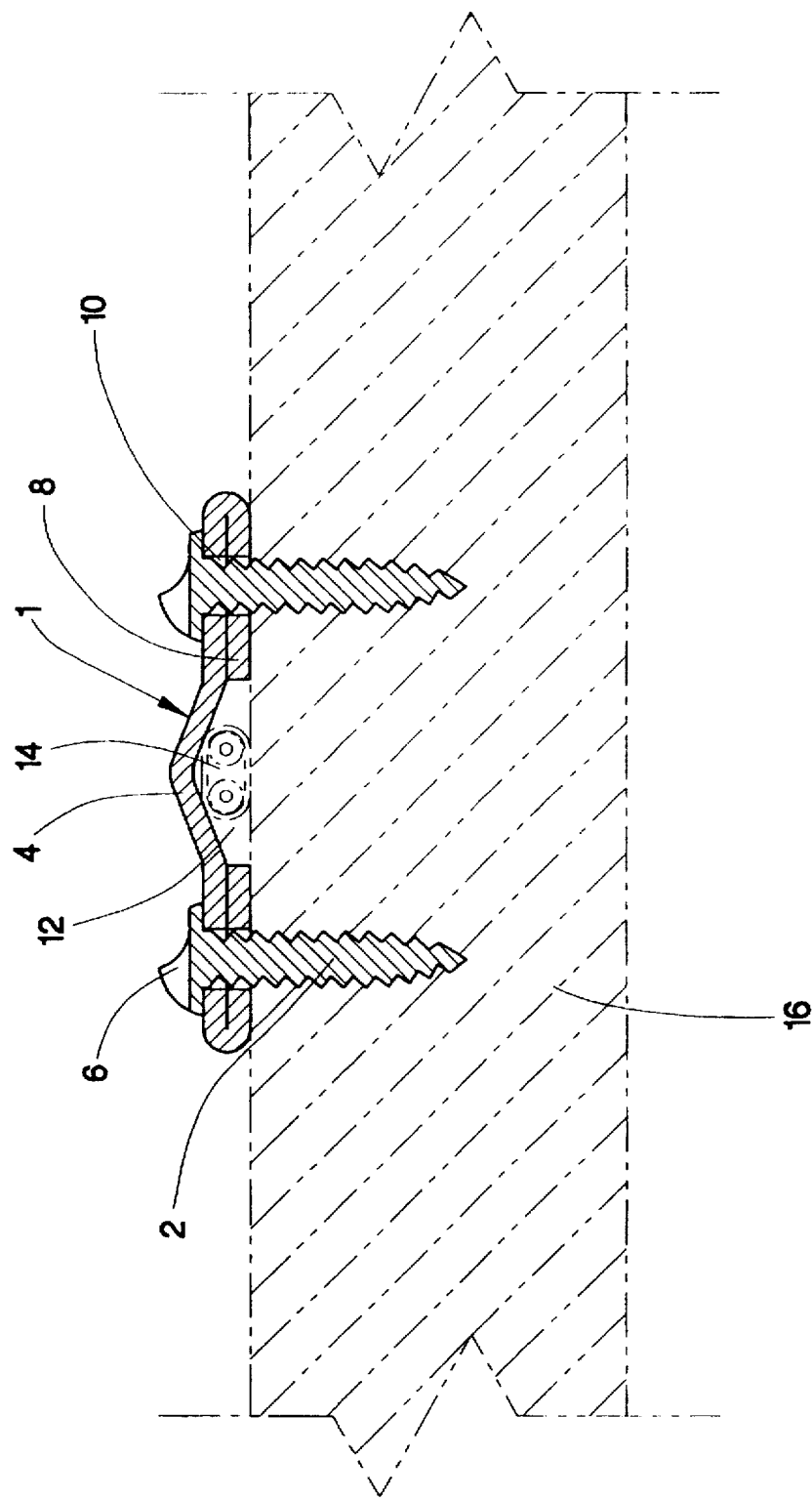
FIG. 3 is a lateral cutaway view of the wire protecting shield.
Figure 4:
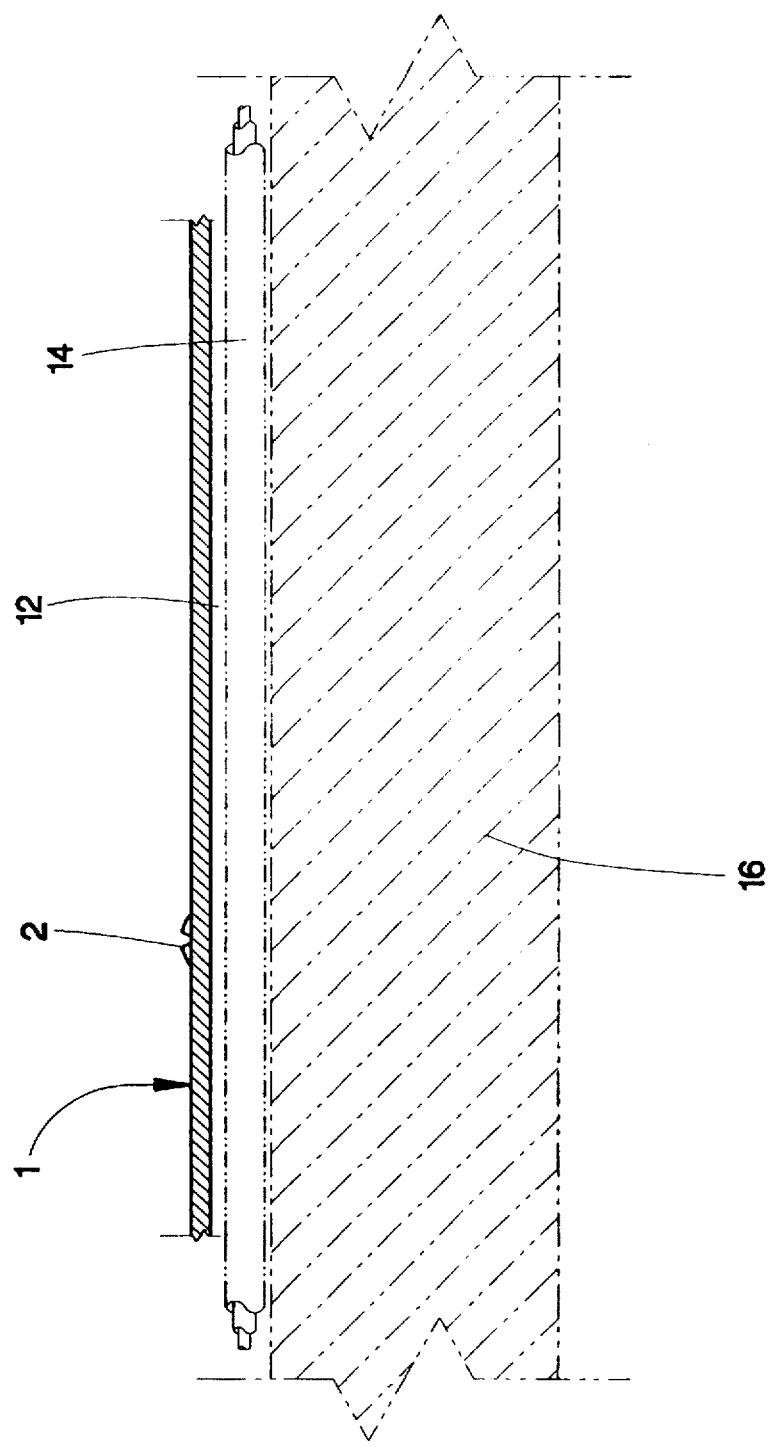
FIG. 4 is a longitudinal cutaway view of a segment of the wire protecting shield.

Referring to FIG. 1, the elongated wire protecting shield 1 has its right and left sides downwardly bent into a pair of opposing under-folded sections 8. Referring to FIG. 3, the under-folded sections 8 form an elongated channel 12. Referring simultaneously to FIGS. 1 and 3, the ceiling 4 of the channel 12 is arcuately upwardly bent causing the channel 12 to extend concavely upward, allowing the wire protecting shield to accommodate the height of a typical telephone wire 14. Referring to FIG. 4, the channel 12 extends longitudinally along the length of the wire protecting shield 1 with the telephone wire 14 extending longitudinally within the channel 12.

Referring to FIG. 3, the wire protecting shield 1 preferably is mounted upon a substrate material such as a wooden board 16 suitable for receiving and securely holding threaded wood screws 2; such substrate typically being a wooden or fiberboard wall surface.

Figure 2:
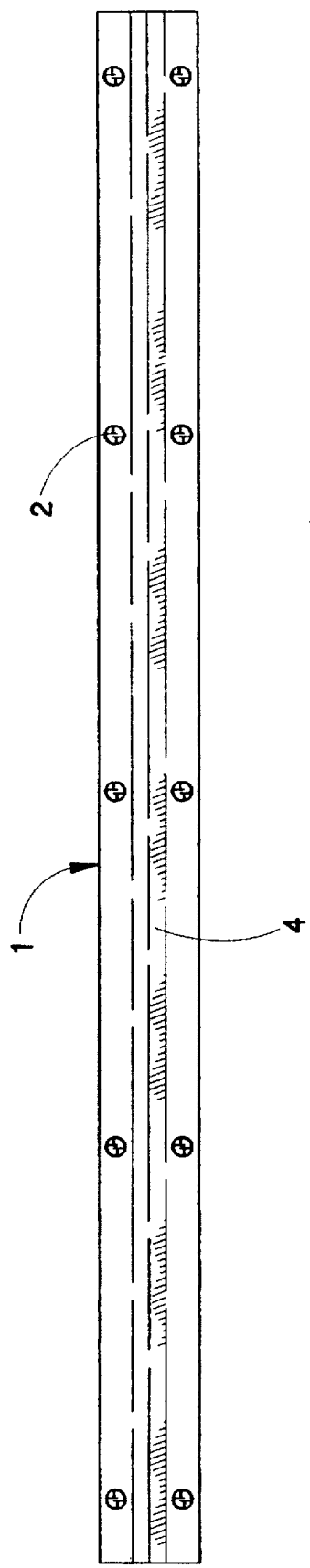
FIG. 2 is a view from above of the wire protecting shield.

Referring simultaneously to FIGS. 2 and 3, the wood screws 2 pass through circular apertures 10 which are drilled through the side portions of the shield 1. Each screw 2 preferably has a "one way" slotted head 6 allowing the driving point of a common screwdriver to drive the screw 2 by imposing a downward driving clockwise motion, and preventing such screws 2 from being withdrawn by such a screwdriver through counter-clockwise rotation. Preferably, referring to FIG. 1, the screws 2 are installed in parallel alignment with each other at six inch intervals.

Preferably, referring to FIG. 1, the wire protecting shield is fabricated utilizing sheet steel 1/16th of an inch thick approximately 2 ¾ inches wide, and cut to a length sufficient to fully cover the exposed length a telephone wire on the exterior of a building. Each under-folded section 8 of the wire protecting shield 1 preferably is ½ inch in width creating, referring to FIG. 3, a channel 12 approximately ½ inch in width.

The wire protecting shield may be composed of rust resistant stainless steel or aluminum or any other bendable rust resistant metal. However, for economy's sake, sheet steel is preferably used; rust being prevented through a "baked on" application of colored enamel. The one way screws 2 preferably are composed of stainless steel.

In operation, referring to FIG. 2, the installer of the wire protecting shield 1 must first make certain that the telephone wire to be shielded overlies a surface suitable for receiving and holding wood screws 2. In the event the wall of a building is flat and suitable for receiving screws, the wire protecting shield may be installed directly upon the exterior surface of the building. In the event the wall surface of the building is not suitable for directly receiving screws, referring to FIG. 1, a wooden board 16 may be fixedly mounted on the exterior surface of the wall. Then the telephone wire 14 is extended along the outer surface of the board 16. The wire protecting shield 1 may then be installed upon the board 16 over the telephone wire 14.

Referring to FIG. 1, where a telephone wire 14 is totally covered by the wire protecting shield 1, an intruder attempting to gain access into the building may no longer simply and easily deactivate the building's telephone system by cutting the telephone wire 14. In order to cut a telephone wire protected by the wire protecting shield 1, an implement such as a hacksaw or a crowbar must be used. In the event such implements are used, noise is created, and a delay is imposed, giving an occupant of the building an opportunity to call the police or activate an alarm before the telephone wire is cut.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A wire protecting shield comprising an oblongated sheet metal plate, the sheet metal plate having an upper surface, a lower surface, a right side, a left side, a right edge, a left edge, a first end, a second end, and having a midline axis extending from the midpoint of the first end to the midpoint of the second end; the right side of the sheet metal plate being under-folded so that the right edge of the sheet metal plate is positioned substantially parallel with the midline axis, and below and to the right of the midline axis; the left side of the sheet metal plate being under-folded so that the left edge of the sheet metal plate is positioned substantially parallel with the midline axis, and below and to the left of the midline axis; the sheet metal plate forming a wire protecting channel having a pair of sidewalls and a ceiling, the sidewalls comprising the right and left edges of the sheet metal plate, and the ceiling comprising the lower surface of the sheet metal plate.

2. The wire protecting shield of claim No. 1 further having a first plurality of apertures extending from the upper surface of the sheet metal plate to its lower surface, the first plurality of apertures being positioned to the right of the midline axis; having a second plurality of apertures extending from the lower surface of the sheet metal plate to said upper surface, the second plurality of apertures being positioned so that they underlie the first plurality of apertures; having a third plurality of apertures extending from the upper surface of the sheet metal plate to said lower surface, the third plurality of apertures being positioned to the left of the midline axis; and having a fourth plurality of apertures extending from the lower surface of the sheet metal plate to said upper surface, the fourth plurality of apertures being positioned so that they underlie the third plurality of apertures; each of the apertures among the first, second, third and fourth pluralities of apertures being capable of receiving a fastening means.

3. The wire protecting shield of claim No. 2, wherein the wire protecting channel has an interior space, wherein the ceiling of the wire protecting channel is arcuately upwardly bent so that the interior space of the wire protecting channel extends concavely upward.

4. The wire protecting shield of claim No. 3 further comprising a plurality of fastening means, each of the fastening means being mounted within and through one of the apertures among the first and third pluralities of apertures and within and through a respective underlying aperture.

5. The wire protecting shield of claim No. 4, wherein the plurality of fastening means comprise threaded screws having enlarged screwheads, each of said threaded screws having a shaft fitted for passage through one of the apertures among the first and third pluralities of apertures and fitted for passage through said respective underlying aperture.

6. The wire protecting shield of claim No. 5, wherein the enlarged screwheads of the threaded screws each have a one-way screwdriving slot.

7. The shield of claim No. 6, wherein the oblongated sheet metal plate comprises a metal selected from the group of steel, stainless steel, or aluminum.

* * * * *